(12) United States Patent
Monma et al.

(10) Patent No.: US 7,923,046 B2
(45) Date of Patent: Apr. 12, 2011

(54) PRODUCTION METHOD OF FOOD AND BEVERAGE PRODUCTS WITH HIGH CONTENT OF γ-AMINOBUTYRIC ACID AND FOOD AND BEVERAGE PRODUCTS WITH HIGH CONTENT OF γ-AMINOBUTYRIC ACID

(75) Inventors: Go Monma, Nasushiobara (JP); Kiro Hayakawa, Nasushiobara (JP)

(73) Assignee: Kagome Co., Ltd., Nagoya-Shi (JP)

( * ) Notice: Subject to any disclaimer, the term of this patent is extended or adjusted under 35 U.S.C. 154(b) by 0 days.

(21) Appl. No.: 11/468,178

(22) Filed: Aug. 29, 2006

(65) Prior Publication Data

US 2007/0048353 A1    Mar. 1, 2007

(30) Foreign Application Priority Data

Aug. 31, 2005    (JP) ................. 2005-251213

(51) Int. Cl.
*A61K 36/81* (2006.01)
*A61K 36/00* (2006.01)
*C12P 7/52* (2006.01)

(52) U.S. Cl. ............... 426/49; 426/7; 435/243; 424/725

(58) Field of Classification Search .................. None
See application file for complete search history.

(56) References Cited

U.S. PATENT DOCUMENTS 4,855,147 A * 8/1989 Yokota et al. .................. 426/43

FOREIGN PATENT DOCUMENTS

| EP | 2000014356 | | 1/2000 |
|---|---|---|---|
| JP | H3-224467 | | 10/1991 |
| JP | H4-51878 | | 2/1992 |
| JP | 2000308457 A | * | 11/2000 |
| JP | 2004-215529 | | 8/2004 |
| JP | 2004-313032 | | 11/2004 |
| JP | 2004313032 | * | 11/2004 |

OTHER PUBLICATIONS

Seibutsu-kogaku Kaishi 75, 239-224, 1997 and English translation of its introduction.
Japanese Pharmacology & Therapeutics (Yakuri to Chiryou) 28, 529-533, 2000 and English translation of its introduction.
Up-to-date Food Processing (Shokuhin to Kaihatsu), vol. 36, No. 6, 4-6, 2001 and the English translations of sections 1 and 2 thereof.
Journal of the Japanese Society of Food Science and Technology (Nippon Shokuhin Kagaku Kogaku Kaishi) 47, 596-603, 2000 and the English translation of its introduction.
Extended European Search Report dated Nov. 13, 2006 received in corresponding European Patent Application Serial No. 06291371.0 (4 pages).

* cited by examiner

*Primary Examiner* — Patricia Leith
(74) *Attorney, Agent, or Firm* — Grossman, Tucker, Perreault & Pfleger, PLLC

(57) ABSTRACT

A method for producing food and beverage products with a high content of γ-aminobutyric acid, wherein processed tomato products whose filtrate has a coloring degree between 0.02 and 0.2 when sugar content is adjusted to 3% are fermented with lactic acid bacteria, and food and beverage products with a high content of γ-aminobutyric acid obtained by such a method.

9 Claims, No Drawings

PRODUCTION METHOD OF FOOD AND BEVERAGE PRODUCTS WITH HIGH CONTENT OF γ-AMINOBUTYRIC ACID AND FOOD AND BEVERAGE PRODUCTS WITH HIGH CONTENT OF γ-AMINOBUTYRIC ACID

BACKGROUND OF THE INVENTION

1. Field of the Invention

The present invention relates to a method for producing food and beverage products with a high content of γ-aminobutyric acid and more specifically, relates to a method for producing food and beverage products containing a high concentration of γ-aminobutyric acid without adding glutamic acid or salts thereof, and food and beverage products with a high content of γ-aminobutyric acid.

Priority is claimed on Japanese Patent Application No. 2005-251213, filed Aug. 31, 2005, the content of which is incorporated herein by reference.

2. Description of the Related Art

γ-Aminobutyric acid is a nonprotein amino acid widely distributed in the living world and it is known to function as an inhibitory neurotransmitter in higher animals (non-patent document 1). Moreover, γ-aminobutyric acid is now known to have various physiological functions, and hypotensive effects (non-patent document 2), brain function improving effects (non-patent document 3), ataractic effects (non-patent document 4), and the like have been reported.

Although γ-aminobutyric acid is one of the natural amino acids contained in food products such as brown rice, beni-koji, tea, and certain vegetables and fruits, only trace amounts thereof are present in these foods and there have been no food products containing an effective dose for expressing the original physiological functions thereof (non-patent document 4). Various methods to increase the content of γ-aminobutyric acid in food products have been studied and techniques such as those below are known.

(i) Production method of food and beverage products characterized in that glutamic acid contained in the processed products of ripe tomatoes is partially converted to γ-aminobutyric acid by allowing glutamic acid decarboxylase to act on the processed products of ripe tomatoes (patent document 1).
(ii) Production method of tomato beverages characterized in that tomatoes or tomatoes and other vegetables and/or fruits are placed in oxygen-free atmosphere and are crushed and squeezed after glutamic acid contained in them has been partially converted to γ-aminobutyric acid (patent document 2). (iii) Production method of food and beverage products or seasoning products, with high content of γ-aminobutyric acid fermented by lactic acid bacteria characterized in that fermentation by lactic acid bacteria is carried out by adding glutamic acid or materials containing glutamic acid and strains of lactic acid bacteria with γ-aminobutyric acid-producing capability to ingredients of food and beverage products or seasoning products (patent document 3).

[non-patent document 1] Seibutsu Kogaku Kaishi 75, 239-244, 1997
[non-patent document 2] Japanese Pharmacology & Therapeutics (Yakuri to Chiryou) 28, 529-533, 2000
[non-patent document 3] up-to-date food processing (Shokuhin to Kaihatsu) Vol. 36, No. 6, 4-6, 2001
[non-patent document 4] Journal of the Japanese Society of Food Science and Technology (Nippon Shokuhin Kagaku Kogaku Kaishi) 47, 596-603, 2000
[patent document 1] Japanese Unexamined Patent Application, First Publication No. Hei 3-224467
[patent document 2] Japanese Unexamined Patent Application, First Publication No. Hei 4-51878
[patent document 3] Japanese Laid-Open Patent Application No. 2004-215529

However, with the techniques described in patent document 1, there have been problems such as a low conversion efficiency to γ-aminobutyric acid of approximately 40% at most (Example 2), and also difficulties in adding enzyme sources aseptically resulting in a high risk of bacterial and/or fungal contamination during conversion of glutamic acid to γ-aminobutyric acid. With the techniques described in patent document 2, glutamic acid is converted to γ-aminobutyric acid in tomatoes due to changes in the metabolic pathways when the tomatoes are placed under oxygen-free conditions. However, likewise, there have also been problems such as a low conversion efficiency of approximately 40% (Example 6), and also difficulties in providing oxygen-free conditions aseptically resulting in a high risk of bacterial and/or fungal contamination during conversion of glutamic acid to γ-aminobutyric acid. With the techniques described in patent document 3, since fermentation does not take place without the addition of glutamic acid to produce γ-aminobutyric acid, there have been economic problems and unfavorable labeling of ingredient statements.

SUMMARY OF THE INVENTION

Accordingly, an object of the present invention is to provide a method for producing food and beverage products containing a high concentration of γ-aminobutyric acid which has a high conversion efficiency from glutamic acid to γ-aminobutyric acid, without any need of adding extra ingredient and which is simple and easy, and food and beverage products with a high γ-aminobutyric acid content obtained from such a production method.

As a result of discussion on a method to convert glutamic acid present in tomatoes to γ-aminobutyric acid with high efficiency, the present inventors focused on the coloring degree of a tomato filtrate. The present inventors then discovered that by fermenting tomatoes whose coloring degree of filtrate fall within a specific range with lactic acid bacteria, glutamic acid can be converted to γ-aminobutyric acid with high efficiency. Moreover, this method was found not to require extra addition of ingredients, have a low risk of bacterial and/or fungal contamination during production, and be simple and easy, to complete the present invention.

In other words, the present invention provides a method for producing food and beverage products with a high γ-aminobutyric acid content characterized by subjecting processed tomato products whose filtrate has a coloring degree in a range between 0.02 and 0.2 when the sugar content is adjusted to 3%, to fermentation with lactic acid bacteria. In addition, the present invention provides a method for producing food and beverage products with a high γ-aminobutyric acid content in which 60% or more of glutamic acid or salts thereof present in the processed tomato products is converted to γ-aminobutyric acid. Moreover, the present invention provides a method for producing food and beverage products with a high γ-aminobutyric acid content in which the processed tomato products are subjected to fermentation with lactic acid bacteria after adjusting the sugar content thereof in a range between 3 and 15%. Furthermore, the present invention provides a method for producing food and beverage products with a high γ-aminobutyric acid content in which fermentation by lactic acid bacteria is performed after insoluble solid contents present in the processed tomato products are adjusted to 5 volume % or less. Additionally, the present invention provides food and beverage products with a high γ-aminobutyric acid content obtained with such production methods.

According to the present invention, a method for producing food and beverage products containing a high concentration of γ-aminobutyric acid which has a high conversion efficiency from glutamic acid to γ-aminobutyric acid, without any need of adding extra ingredient, and which is simple and easy, and food and beverage products with a high γ-aminobutyric acid content obtained from such production method can be obtained.

DETAILED DESCRIPTION OF THE INVENTION

Tomato processing means to obtain processed tomato products used in the present invention is not particularly limited. Examples of such means include squeezing, grinding, crushing, and chopping of tomatoes, drying or concentrating of tomatoes processed in such ways, obtaining a supernatant of the processed tomato products by centrifugation, or clarifying the processed tomato products.

In the present invention, the coloring degree of filtrate of the processed tomato products needs to be in a range between 0.02 and 0.2 when the sugar content thereof is adjusted to 3%, and the range between 0.02 and 0.15 is preferable. When the coloring degree of filtrate exceeds 0.2, the conversion efficiency from glutamic acid to γ-aminobutyric acid rapidly declines although the lactic acid fermentation proceeds. Although the cause for this finding is not necessarily clear, it is assumed that it is due to the production of substances which inhibit the conversion from glutamic acid to γ-aminobutyric acid. Moreover, when the coloring degree of filtrate is below 0.02, the content of glutamic acid itself would be too low, resulting in insufficient production of γ-aminobutyric acid.

Raw tomatoes have a coloring degree of filtrate in a range between 0.02 and 0.2 when the sugar content is 3%. Accordingly, processed tomato products, which are not yet heated, have a coloring degree of filtrate in a range between 0.02 and 0.2 when the sugar content is 3%. Moreover, processed tomato products which are heated also have a coloring degree of filtrate of 0.02 or higher when the sugar content is 3%. Even when processed tomato products with a coloring degree of filtrate exceeding 0.2 when the sugar content is 3% are decolorized using an ion-exchange resin or the like, or diluted with water, for example, to adjust the coloring degree of filtrate in a range between 0.02 and 0.2, later conversion efficiency from glutamic acid to γ-aminobutyric acid due to fermentation is low, and the effect of the present invention is not obtained. Accordingly, taking the above points into consideration, processed tomato products used in the present invention in which the coloring degree of filtrate is in a range between 0.02 and 0.2 when the sugar content is 3%, can be obtained by use of unheated processed tomato products, or by heating, where appropriate, unheated processed tomato products so that the coloring degree of filtrate thereof is between 0.02 and 0.2. Since proliferation of various bacteria and/or fungi and generation of products by enzymes are highly likely during the later fermentation process with lactic acid bacteria when unheated processed tomato products are used, it is preferable to heat, where appropriate, unheated processed tomato products so that the coloring degree of filtrate thereof is between 0.02 and 0.2 to carry out pasteurization and inactivation of enzymes. After heating, where appropriate, unheated processed tomato products so that the coloring degree of filtrate thereof is between 0.02 and 0.2, it is possible to dilute, where appropriate, the resultant with water or the like aseptically as long as the coloring degree of filtrate thereof is in the range between 0.02 and 0.2.

The coloring degree of filtrate when the sugar content is 3%, is, for example, 0.03 in unheated liquid obtained by squeezing tomatoes, 0.1 in the squeezed tomato liquid which is heated at 120° C. for 10 minutes, and 0.25 in the squeezed tomato liquid which is heated at 130° C. for 30 minutes.

The coloring degree of filtrate correlates with heating history and the more it is heated at high temperature for a long time, the more the coloring degree of filtrate rises. Moreover, the higher the degree of concentration of processed tomato products at the time of heating, the more the coloring degree of filtrate rises. Although heating tomato-squeezed liquid for pasteurization does not contribute much to a rise in the coloring degree of filtrate, since highly concentrated processed tomato products are heated at high temperature for a long time at the time of concentration, the rise in coloring degree of filtrate is marked. Accordingly, tomatoes subjected to vacuum concentration or dried products thereof obtained by further drying them have, in many cases, a coloring degree of filtrate exceeding 0.2 when the sugar content is 3%, and thus, are difficult to use as the processed tomato products in the present invention. On the other hand, straight tomato juice which is obtained by crushing and squeezing tomatoes while heating, sterilizing, and cooling, or those subjected to membrane concentration by use of ultrafiltration, reverse osmosis filtration, or the like can be used as the processed tomato products in the present invention since they are not heated at high temperature for a long time.

The coloring degree of filtrate is measured by the method below in the present invention. Firstly, processed tomato products are adjusted with water or the like so that the sugar content thereof is 3%. Secondly, the resultant is filtered using a filter paper (No. 5A manufactured by ADVANTEC). A funnel-type glass filter (36060FNL3G4 manufactured by ASAHI TECHNO GLASS CORPORATION) with Hyflo super-cel (manufactured by Celite Co. and distributed by Wako Pure Chemical Industries, Ltd. catalog No. 534-02315) placed so that the thickness thereof is approximately 5 mm is precoated with distilled water. The above filtered processed tomato products are passed through this funnel-type glass filter and further filtered with a membrane filter (DISMIC-25CS045AN manufactured by ADVANTEC) with a pore size of 0.45 μm. The absorbance of the obtained processed tomato products at 450 nm is measured using a spectrophotometer (U-3310 manufactured by HITACHI, LTD.) and the obtained value is defined as the coloring degree of filtrate.

The sugar content of processed tomato products is preferably in a range of 3 to 15% and particularly preferably in a range of 3 to 5%. When the sugar content is in a range between 3 and 15%, fermentation by lactic acid bacteria proceeds sufficiently, and the conversion efficiency from glutamic acid to γ-aminobutyric acid further improves. When processed tomato products with a sugar content of less than 3% are used, the coloring degree of filtrate when the sugar content is 3% is first measured, and then sterile water or the like can be used for dilution until the targeted sugar content is obtained. Moreover, insoluble solid contents in the processed tomato products are preferably 5 volume % or less. When insoluble solid contents are 5 volume % or less, fermentation by lactic acid bacteria proceeds sufficiently, and the conversion efficiency from glutamic acid to γ-aminobutyric acid further improves. Adjustment of insoluble solid contents can be carried out by filtration such as normal filtration, microfiltration, and ultrafiltration or centrifugation.

Insoluble solid contents are measured by the method below in the present invention. 10 ml of processed tomato products are put in a 105 mm long centrifuge tube and the proportion of sediment volume relative to the total volume is measured when the tube is centrifuged under conditions where effective radius of gyration is 14.5 cm, the number of revolutions is 3000 rpm, and centrifugation time is 10 minutes, and the obtained value is defined as insoluble solid contents.

Such processed tomato products are fermented with lactic acid bacteria in the present invention. *Lactobacillus brevis* is preferable as a lactic acid bacterium and strains of *Lactobacillus brevis* IFO3345, *Lactobacillus brevis* IFO3960, *Lactobacillus brevis* IFO12005, and *Lactobacillus brevis* IFO12520 are particularly preferable. All these bacterial strains can be obtained from the NITE Biological Resource Center (NBRC), Japan. These bacterial strains can be used on their own or by combining two or more strains in the present invention.

For culturing lactic acid bacteria, the addition of precultured product, which is obtained by adding lactic acid bacteria to already pasteurized tomato products and growing them in advance, is preferable from the viewpoints of production efficiency and stability. For the conditions to make processed tomato products pasteurized when preparing the precultured product, temperatures between 80 and 110° C. for 1 to 20 minutes are preferable although there is no particular limitation. For the conditions of preculturing bacteria, growing them under optimum temperature for the lactic acid bacteria to be used, for example, between 25 and 42° C. for 8 to 48 hours is preferable although there is no particular limitation. Cell numbers of lactic acid bacteria in the precultured product are preferably between $10^7$ and $10^9$ cfu/mL.

The added proportion of the above lactic acid bacteria precultured product relative to processed tomato products is preferably between 0.1 and 20 mass % and is particularly preferable between 0.1 and 10 mass %. For the fermentation conditions, optimum temperature for the lactic acid bacteria to be used, for example, between 25 and 42° C. for 12 to 96 hours is preferable.

The lactic acid bacteria fermented product obtained as described above has a high conversion efficiency from glutamic acid to γ-aminobutyric acid of at least 60% or higher and contains a high concentration of γ-aminobutyric acid. By fermenting with lactic acid bacteria, a higher conversion efficiency of glutamic acid to γ-aminobutyric acid can be achieved compared to the case where specific enzymes or enzyme sources which contain the specific enzymes are used. Moreover, conversion of glutamic acid to γ-aminobutyric acid with high efficiency can be achieved without adding any glutamic acid other than that originated from the tomatoes. Additionally, the conversion efficiency of glutamic acid to γ-aminobutyric acid is calculated with the equation below.

$$\text{Conversion efficiency}(\%) = \frac{[GABA]}{[GABA]_{max}} \quad \text{[Equation 1]}$$

$$= \frac{[GABA] - [GABA]_0}{[Glu]_0 \times \frac{103.1}{147.1}} \times 100$$

GABA means γ-aminobutyric acid here and [GABA] is the concentration of γ-aminobutyric acid after completing fermentation. $[GABA]_{max}$ describes the concentration of γ-aminobutyric acid when glutamic acid before the fermentation is all converted to γ-aminobutyric acid by fermentation and $[GABA]_0$ is the concentration of γ-aminobutyric acid at the time of starting fermentation. $[Glu]_0$ is the concentration of glutamic acid at the time of starting fermentation and 147.1 and 103.1 are molecular weights of glutamic acid and γ-aminobutyric acid, respectively.

Food and beverage products with a high content of γ-aminobutyric acid produced by the method of the present invention can be made into, for example, forms such as tomato juice, tomato puree, and tomato sauce. Moreover, these can be added to food products such as fruits and vegetables other than tomatoes, fruit juices, vegetable juices, soybean milk, wort, milk, yoghurt, and others. Next, the present invention will be described in more detail by showing examples, although the present invention is not limited to the working examples below.

EXAMPLE 1

Liquid obtained by squeezing tomatoes was concentrated until the sugar content was 20% using a reverse osmosis membrane (AFC99 manufactured by PCI) and then diluted with water down to the sugar content of 5% (hereinafter referred to as "5% diluted tomato product"). 10 ml of the 5% diluted tomato product was put into a test tube with 18 mm φ and pasteurized by heating at 95° C. for 10 minutes. Lactic acid bacteria (*Lactobacillus brevis* IFO3960 strain obtained from NBRC) were added to this and they were precultured at 30° C. for 18 hours (precultured product). Separate from this, 200 ml of the 5% diluted tomato product was put into a 300 ml Erlenmeyer flask and pasteurized by heating at 95° C. for 10 minutes (processed tomato products 1). The coloring degree of filtrate of the processed tomato products 1 after adjusting the sugar content to 3% was 0.13. Sample 1 was obtained by adding 2 ml of the precultured product to the processed tomato products 1 and culturing the resultant at 30° C. for 72 hours. Insoluble solid content at this time was 20 volume %.

EXAMPLE 2

Liquid obtained by squeezing tomatoes was concentrated until the sugar content was 20% using a reverse osmosis membrane (AFC99 manufactured by PCI) and then diluted with water down to the sugar content of 3% (hereinafter referred to as "3% diluted tomato product"). 200 ml of the 3% diluted tomato product was put into a 300 ml Erlenmeyer flask and pasteurized by heating at 95° C. for 10 minutes (processed tomato products 2). The coloring degree of filtrate of the processed tomato products 2 was 0.12. Sample 2 was obtained by adding 2 ml of the precultured product to the processed tomato products 2 and culturing the resultant at 30° C. for 72 hours. Insoluble solid content at this time was 15 volume %.

EXAMPLE 3

Liquid obtained by squeezing tomatoes was concentrated until the sugar content was 20% using a reverse osmosis membrane (AFC99 manufactured by PCI) and then diluted with water down to the sugar content of 3% and the resultant was centrifuged for 10 minutes at 3800×g using a centrifuge (CR20 manufactured by HITACHI, LTD.) and the supernatant was collected (hereinafter referred to as "3% diluted supernatant product"). 200 ml of the 3% diluted supernatant product was put into a 300 ml Erlenmeyer flask and pasteurized by heating at 95° C. for 10 minutes (processed tomato products 3). The coloring degree of filtrate of the processed tomato products 3 was 0.11. Sample 3 was obtained by adding 2 ml of the precultured product to the processed tomato products 3 and culturing the resultant at 30° C. for 72 hours. Insoluble solid content at this time was 1 volume %.

EXAMPLE 4

Liquid obtained by squeezing tomatoes was concentrated until the sugar content was 20% using a reverse osmosis membrane (AFC99 manufactured by PCI) and then diluted with water down to the sugar content of 5% and the resultant was centrifuged for 10 minutes at 3800×g using a centrifuge (CR20 manufactured by HITACHI, LTD.) and the supernatant was collected (hereinafter referred to as "5% diluted supernatant product"). 200 ml of the 5% diluted supernatant product was put into a 300 ml Erlenmeyer flask and pasteurized by heating at 95° C. for 10 minutes (processed tomato products 4). The coloring degree of filtrate of the processed tomato products 4 after adjusting the sugar content to 3% was 0.14. Sample 4 was obtained by adding 2 ml of the precultured product to the processed tomato products 4 and culturing the resultant at 30° C. for 72 hours. Insoluble solid content at this time was 2 volume %.

EXAMPLE 5

Liquid obtained by squeezing tomatoes was concentrated until the sugar content was 20% using a reverse osmosis membrane (AFC99 manufactured by PCI) and then diluted with water down to the sugar content of 10% and the resultant was centrifuged for 10 minutes at 3800×g using a centrifuge (CR20 manufactured by HITACHI, LTD.) and the supernatant was collected (hereinafter referred to as "10% diluted supernatant product"). 200 ml of the 10% diluted supernatant product was put into a 300 ml Erlenmeyer flask and pasteurized by heating at 95° C. for 10 minutes (processed tomato products 5). The coloring degree of filtrate of the processed tomato products 5 after adjusting the sugar content to 3% was 0.14. Sample 5 was obtained by adding 2 ml of the precultured product to the processed tomato products 5 and culturing the resultant at 30° C. for 72 hours. Insoluble solid content at this time was 4 volume %.

TEST EXAMPLE 1

The above samples 1 to 4 and the sample 5 were diluted (volume) 10 times and 20 times, respectively, with 3% aqueous 5-sulfosalicylic acid and the resultants were filtered using a membrane filter (DISMIC-25CS045AN manufactured by ADVANTEC) and measured for their amounts of γ-aminobutyric acid using an amino acid autoanalyzer (L-8800A manufactured by HITACHI, LTD.). The amounts of γ-aminobutyric acid were calculated from a calibration curve made using γ-aminobutyric acid (manufactured by ACROS ORGANICS). Moreover, the glutamic acid amounts in the above processed tomato products 1 to 5 were measured using the above amino acid autoanalyzer. Subsequently, conversion efficiency of glutamic acid to γ-aminobutyric acid was calculated according to the aforementioned equation 1. Results are shown in Table 1.

TABLE 1

| Example | Coloring degree of filtrate when the sugar content is 3% | $[Glu]_0$ (g/L) | $[GABA]_0$ (g/L) | $[GABA]$ (g/L) | Conversion efficiency (%) |
| --- | --- | --- | --- | --- | --- |
| Example 1 | 0.13 | 2.4 | 0.28 | 1.3 | 61 |
| Example 2 | 0.12 | 1.4 | 0.20 | 0.90 | 71 |
| Example 3 | 0.11 | 1.3 | 0.20 | 0.91 | 78 |
| Example 4 | 0.14 | 2.3 | 0.29 | 1.7 | 87 |
| Example 5 | 0.14 | 4.5 | 0.64 | 2.7 | 65 |

As is apparent from Table 1, all samples from Examples 1 to 5 had a high conversion efficiency of γ-aminobutyric acid higher than 60%.

COMPARATIVE EXAMPLE 1

200 ml of the above 5% diluted tomato product was put into a 300 ml Erlenmeyer flask and pasteurized by heating at 125° C. for 10 minutes (processed tomato products 6). The coloring degree of filtrate of the processed tomato products 6 after adjusting the sugar content to 3% was 0.27. Sample 6 was obtained by adding 2 ml of the precultured product to the processed tomato products 6 and culturing the resultant at 30° C. for 72 hours. Insoluble solid content at this time was 20 volume %.

COMPARATIVE EXAMPLE 2

200 ml of the above 5% diluted supernatant product was put into a 300 ml Erlenmeyer flask and pasteurized by heating at 125° C. for 10 minutes (processed tomato products 7). The coloring degree of filtrate of the processed tomato products 7 after adjusting the sugar content to 3% was 0.24. Sample 7 was obtained by adding 2 ml of the precultured product to the processed tomato products 7 and culturing the resultant at 30° C. for 72 hours. Insoluble solid content at this time was 2 volume %.

COMPARATIVE EXAMPLE 3

1 kg of the edible part of squash was ground and squeezed to obtain 0.7 kg of squeezed liquid. Sample 8 was obtained by adding 100 g of the above squeezed liquid to 200 ml of the above processed tomato products 1, and left to keep at 30° C. for 4 hours.

COMPARATIVE EXAMPLE 4

Commercially available tomato paste (manufactured by KAGOME CO., LTD.) was diluted down to 10% sugar content with water and after adding 0.5 mass % of yeast extract (manufactured by DIFCO) to this, 200 ml of the resultant was put into a 300 ml Erlenmeyer flask and pasteurized by heating at 95° C. for 10 minutes. Lactobacillus brevis IF03960 strain was added to this and it was cultured at 30° C. for 72 hours to obtain sample 9. Additionally, when the commercially available tomato paste (manufactured by KAGOME CO., LTD.) was diluted down to 10% sugar content with water and pasteurized by heating at 95° C. for 10 minutes, the coloring degree of filtrate thereof after adjusting the sugar content to 3% was 0.24.

TEST EXAMPLE 2

The above samples 6 to 8 and the sample 9 were diluted (volume) 10 times and 20 times, respectively, with 3% aqueous 5-sulfosalicylic acid and the resultants were filtered using a membrane filter (DISMIC-25CS045AN manufactured by ADVANTEC) and measured for their amounts of γ-aminobutyric acid using an amino acid autoanalyzer (L-8800A manufactured by HITACHI, LTD.). The amounts of γ-aminobutyric acid were calculated from a calibration curve made using γ-aminobutyric acid (manufactured by ACROS ORGANICS). Moreover, the glutamic acid amounts in the above processed tomato products 1, 6 to 8 were measured using the above amino acid autoanalyzer. Subsequently, conversion efficiency of glutamic acid to γ-aminobutyric acid was calculated according to the aforementioned equation 1. Results are shown in Table 2.

TABLE 2

| Comparative Example | Coloring degree of filtrate when the sugar content is 3% | $[Glu]_0$ (g/L) | $[GABA]_0$ (g/L) | $[GABA]$ (g/L) | Conversion efficiency (%) |
|---|---|---|---|---|---|
| Comparative Example 1 | 0.24 | 2.4 | 0.29 | 0.81 | 31 |
| Comparative Example 2 | 0.27 | 2.3 | 0.30 | 0.87 | 35 |
| Comparative Example 3 | 0.45 | 1.7 | 0.22 | 0.49 | 23 |
| Comparative Example 4 | 0.24 (without yeast extract) | 4.3 | 0.70 | 1.6 | 30 |

As is apparent from Table 2, all samples from Comparative Examples 1 to 4 had a low conversion efficiency of γ-aminobutyric acid lower than 40%. Moreover, various bacteria and fungi were propagated in sample 8 of Comparative Example 3.

The present invention can be used especially in the field of health foods.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A method for producing food and beverage products with γ-aminobutyric acid, comprising:
   choosing processed tomato products, whose filtrate has a coloring degree between 0.02 and 0.2 when sugar content is 3%,
   sterilizing the processed tomato products with heating so that the coloring degree of filtrate thereof is between 0.02 and 0.2 when sugar content is 3%,
   fermenting the processed tomato products, with a single strain lactic acid bacteria, and
   converting, in the absence of exogenous glutamic acid, 60% or more of glutamic acid or salts thereof present in the processed tomato products to γ-aminobutyric acid, wherein the lactic acid bacteria is *Lactobacillus brevis*.

2. The method for producing food and beverage products with γ-aminobutyric acid according to claim 1, wherein the processed tomato products are fermented with lactic acid bacteria after the sugar content thereof is adjusted to 3 to 15%.

3. The method for producing food and beverage products with γ-aminobutyric acid according to claim 1, wherein the processed tomato products are fermented with lactic acid bacteria after insoluble solid contents are adjusted to 5 volume % or less.

4. The method for producing food and beverage products with γ-aminobutyric acid according to claim 2, wherein the processed tomato products are fermented with lactic acid bacteria after insoluble solid contents are adjusted to 5 volume % or less.

5. A method for producing food and beverage products with γ-aminobutyric acid according to claim 1, further comprising:
   concentrating the processed tomato products by use of ultrafiltration or reverse osmosis filtration so that the coloring degree of filtrate thereof is between 0.02 and 0.2 when sugar content is 3%.

6. A method for producing food and beverage products with γ-aminobutyric acid, comprising:
   choosing processed tomato products, whose filtrate has a coloring degree between 0.02 and 0.2 when sugar content is 3%,
   sterilizing the processed tomato products with heating so that the coloring degree of filtrate thereof is between 0.02 and 0.2 when sugar content is 3%,
   concentrating the processed tomato products by use of ultrafiltration or reverse osmosis filtration so that the coloring degree of filtrate thereof is between 0.02 and 0.2 when sugar content is 3%,
   fermenting the processed tomato products, with a single strain lactic acid bacteria, and converting, in the absence of exogenous glutamic acid, 60% or more of glutamic acid or salts thereof present in the processed tomato products to γ-aminobutyric acid, wherein the lactic acid bacteria is *Lactobacillus brevis*.

7. The method for producing food and beverage products with γ-aminobutyric acid according to claim 6, wherein the processed tomato products are fermented with lactic acid bacteria after the sugar content thereof is adjusted to 3 to 15%.

8. The method for producing food and beverage products with γ-aminobutyric acid according to claim 6, wherein the processed tomato products are fermented with lactic acid bacteria after insoluble solid contents are adjusted to 5 volume % or less.

9. The method for producing food and beverage products with γ-aminobutyric acid according to claim 7, wherein the processed tomato products are fermented with lactic acid bacteria after insoluble solid contents are adjusted to 5 volume % or less.

* * * * *